United States Patent [19]

White et al.

[11] Patent Number: 4,881,874

[45] Date of Patent: Nov. 21, 1989

[54] TAIL ROTOR

[75] Inventors: Billy P. White, Arlington; Dwayne E. Morrison, Rowlett, both of Tex.

[73] Assignee: Bell Helicopter Textron Inc., Fort Worth, Tex.

[21] Appl. No.: 175,770

[22] Filed: Mar. 31, 1988

[51] Int. Cl.$^4$ ............................................. B64C 27/36
[52] U.S. Cl. .................................. 416/138; 416/115; 416/123; 416/141; 416/148
[58] Field of Search ..................... 416/115, 231 B, 123, 416/102, 148, 141, 138 A, 198 R, 157 B, 127, 130

[56] References Cited

U.S. PATENT DOCUMENTS

| | | | |
|---|---|---|---|
| 1,912,354 | 5/1933 | Pescara | 416/115 |
| 2,491,042 | 12/1949 | Hayot | 416/127 X |
| 2,755,866 | 7/1956 | Apostolescu | 416/115 |
| 2,829,721 | 10/1957 | Gebhard . | |
| 3,163,231 | 12/1964 | Barnes et al. | 416/157 R |
| 3,592,559 | 7/1971 | Ward | 416/121 R |
| 3,700,351 | 10/1972 | Flux | 416/123 |
| 3,762,669 | 10/1973 | Curci . | |
| 3,784,319 | 1/1974 | Amer et al. | 416/123 X |
| 4,104,003 | 8/1978 | Mouille | 416/141 |
| 8,780,022 | 2/1908 | Roper . | |

FOREIGN PATENT DOCUMENTS

| | | | |
|---|---|---|---|
| 137048 | 5/1947 | Australia | 416/123 |
| 900353 | 6/1945 | France | 416/130 |
| 980312 | 5/1951 | France | 416/231 B |
| 465088 | 8/1951 | Italy | 416/141 R |
| 752220 | 7/1956 | United Kingdom | 416/123 |

*Primary Examiner*—Powell, Jr. Everette A.
*Attorney, Agent, or Firm*—Richards, Harris, Medlock & Andrews

[57] ABSTRACT

A helicopter tail rotor (10, 130) includes a drive mast (12) having an axis of rotation (14). A first blade pair (20) is mounted for rotation about the drive mast (12). The first blade pair (20) includes a pitch change axis (54) perpendicularly disposed to the drive mast axis of rotation (14). A second blade pair (34) is mounted for rotation about the drive mast (12) and is spaced apart from and parallel disposed to the first blade pair (20). The second blade pair (34) includes a pitch change axis (60) parallel to the pitch change axis (54) of the first blade pair (20).

7 Claims, 2 Drawing Sheets

4,881,874

TAIL ROTOR

TECHNICAL FIELD

This invention relates to tail rotors for a helicopter, and more particularly to a four bladed stacked tail rotor.

BACKGROUND OF THE INVENTION

Helicopter tail rotors provide anti-torque forces to maintain stabilized flight and further provide aircraft heading control. With the use of larger helicopter structures, for increased cargo capacity, larger main rotors are utilized resulting in a larger torque on the helicopter airframe. To counter this larger torque, improved tail rotors are required.

Two typical methods of improving the performance of a tail rotor include increasing the rotor blade radius and increasing the number of rotor blades. Increasing the rotor blade radius is undesirable as an increased radius reduces the clearance between the main rotor and tail rotor. Increasing the number of blades in a tail rotor results in an increased tail rotor thrust without increasing the rotor radius. However, multi-bladed tail rotors require a gimbled hub adding extra weight to the tail rotor as well as resulting in a more complex hub than typically used for a two-bladed rotor. Instead of a gimbled hub, a composite hub may be used. A soft-inplane composite hub is very difficult to make stable inplane, and a stiff-inplane hub can be had only by paying a severe weight penalty. Furthermore, rigid four-bladed stiff-inplane tail rotors tend to be heavy because of high loads while articulated and soft-inplane four-bladed tail rotors introduce stability problems into the system.

A need has thus arisen for an improved tail rotor for a helicopter which produces increased tail rotor thrust without an increase in blade radius or tip speed. Such an improved tail rotor must produce increased anti-torque thrust efficiently without adding appreciable weight to the tail rotor of the helicopter.

SUMMARY OF THE INVENTION

In accordance with the present invention, a helicopter tail rotor includes a drive mast having an axis of rotation. A first blade pair is mounted for rotation about the drive mast axis of rotation. The first blade pair includes a pitch change axis perpendicularly disposed to the drive mast axis of rotation. A second blade pair is mounted for rotation about the drive mast axis of rotation and is spaced apart from and parallel disposed to the first blade pair. The second blade pair includes a pitch change axis parallel to the pitch change axis of the first blade pair.

In accordance with another aspect of the present invention, two, two-bladed tail rotors are mounted to a single one-piece hub which attaches to the tail rotor drive shaft by two flapping bearings. The central hub positions the two rotors to maintain a fixed separation of the rotor's pitch-change axes and causes the two rotors to always have identical azimuth locations. The two rotor's pitch horns are linked together, which causes the pitch relationship of the two rotors to be invariant. The use of separate flapping axes, eliminating the one-piece hub, is also disclosed.

BRIEF DESCRIPTION OF THE DRAWINGS

For a more complete understanding of the present invention and for further advantages thereof, reference is now made to the following Description taken in conjunction with the accompanying Drawings in which.

DESCRIPTION OF THE PREFERRED EMBODIMENTS

Figure 1:
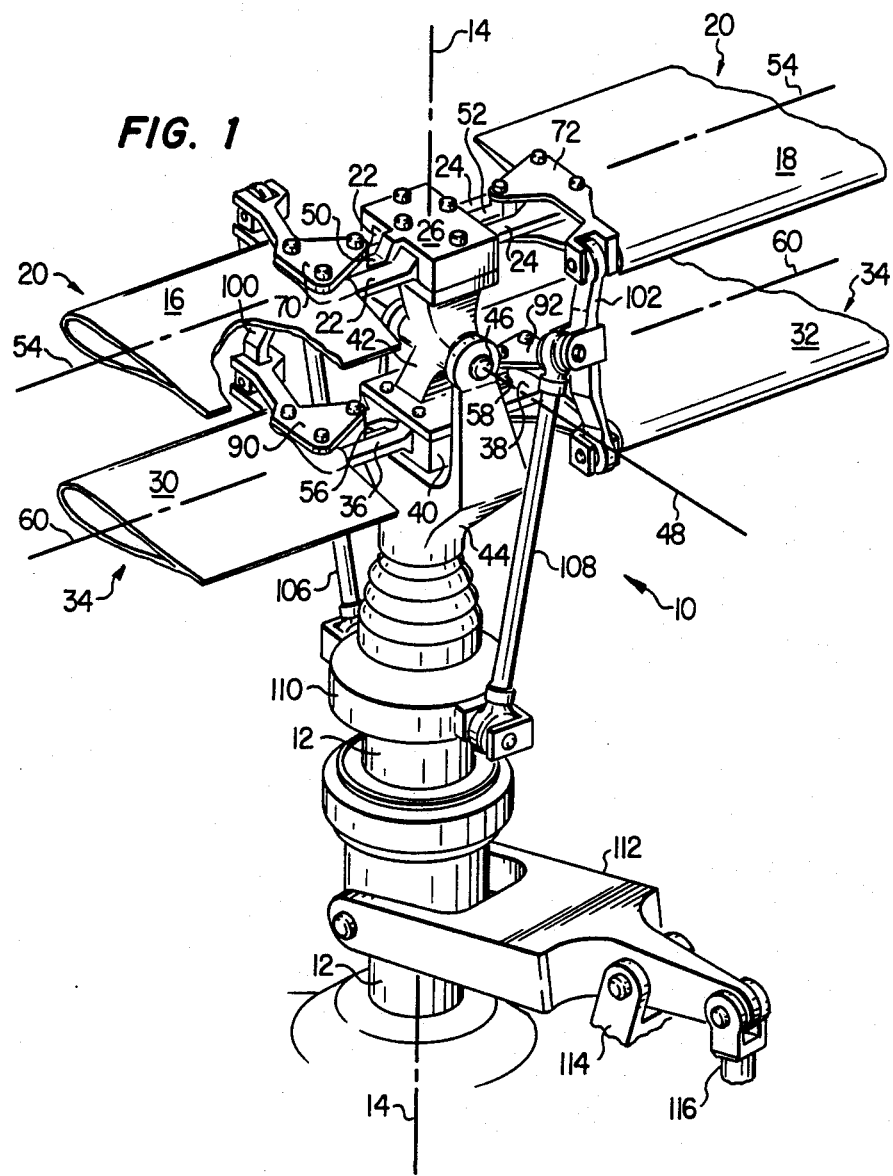
FIG. 1 is a perspective view of a first embodiment of the present helicopter tail rotor.

Referring to FIG. 1, a helicopter tail rotor is illustrated and is generally identified by the numeral 10. Tail rotor 10 includes a drive mast 12 having an axis of rotation 14. Tail rotor 10 includes rotor blades 16 and 18 comprising an outer or first rotor blade pair, generally identified by the numeral 20. First rotor blade pair 20 is mounted for rotation about axis 14 and include a one piece hub/flexure/spar structure made of unidirectional fiber strands which extend to the tip of rotor blades 16 and 18. First rotor blade pair 20 includes flapping flexure portions 22 and 24, and is clamped in a hub clamp 26 for teetering motion about the flapping axis.

Also mounted for rotation about drive mast 12 are rotor blades 30 and 32 comprising an inner or second rotor blade pair, generally identified by the numeral 34. Second rotor blade pair 34 is mounted spaced apart from first rotor blade pair 20 by approximately a blade chord length, and is mounted parallel to first rotor blade pair 20. Second rotor blade pair 34 is constructed similarly to first rotor blade pair 20 and includes flapping flexure portions 36 and 38 and is clamped in a hub clamp 40.

Hub clamp 26 and hub clamp 40 are interconnected via a link 42 which is pivotally connected to drive mast 12 via a clevis 44 and trunnion 46. Flapping motion of tail rotor 10 occurs about an axis 48 passing through trunnion 46.

Tail rotor 10 includes pitch change spindles 50 and 52 which define a pitch change axis 54. Rotor blades 16 and 18 rotate about pitch change axis 54 to allow pitch change about pitch change spindles 50 and 52, respectively. Similarly, rotor blades 30 and 32 rotate about pitch change spindles 56 and 58 which define a pitch change axis 60.

Pitch horns 70 and 72 are connected at their outboard margin to the root of rotor blades 16 and 18, respectively and clamp to the upper and lower surfaces of rotor blades 16 and 18 to allow rotor blades 16 and 18 to rotate smoothly about pitch change spindles 50 and 52, respectively. Pitch horns 70 and 72 encompass parts of flapping flexure portions 22 and 24. In a similar configuration, pitch horns 90 and 92 are connected at their outboard margins to the root of rotor blades 30 and 32, respectively to allow rotor blades 30 and 32 to rotate about pitch change spindles 56 and 58.

Pitch horn 70 and pitch horn 90 are pivotally interconnected via a pitch horn connector link 100, and pitch horns 72 and 92 are pivotally interconnected through a pitch horn connector link 102. Pitch horn connector links 100 and 102 are connected to pitch links 106 and 108, respectively. Pitch links 106 and 108 are connected to a swashplate 110. Linear motion is imparted to swashplate 110 through a pitch control clevis 112 which is interconnected to an idler lever 114 which is controlled by a control input lever 116 operated by the pilot of the helicopter.

Therefore it can be seen that pitch change of tail rotor 10 occurs simultaneously within first and second rotor blade pairs 20 and 34 about pitch change axes 54 and 60, respectively through operation of swashplate 110 which imparts linear motion to pitch links 106 and 108 which subsequently causes rotation of first rotor blade pair 20 about pitch change spindles 50 and 52 and rotation of second rotor blade pair 34 about pitch change spindles 56 and 58. The rise and fall slide arrangement of swashplate 110 when moved upwardly along drive mast 12 causes the trailing edge of rotor blade pairs 20 and 34 to move down and decrease the pitch angle. Similarly, if swashplate 110 is pulled down along drive mast 12, the trailing edge of rotor blade pairs 20 and 34 will be pulled up to increase the pitch angle. Both rotor blade pairs 20 and 34 are constrained to move at approximately the same angle about pitch change axes 54 and 60, respectively. Tail rotor 10 includes a "below the mast" control system for controlling the pitch change of rotor blade pairs 20 and 34.

Figure 2:
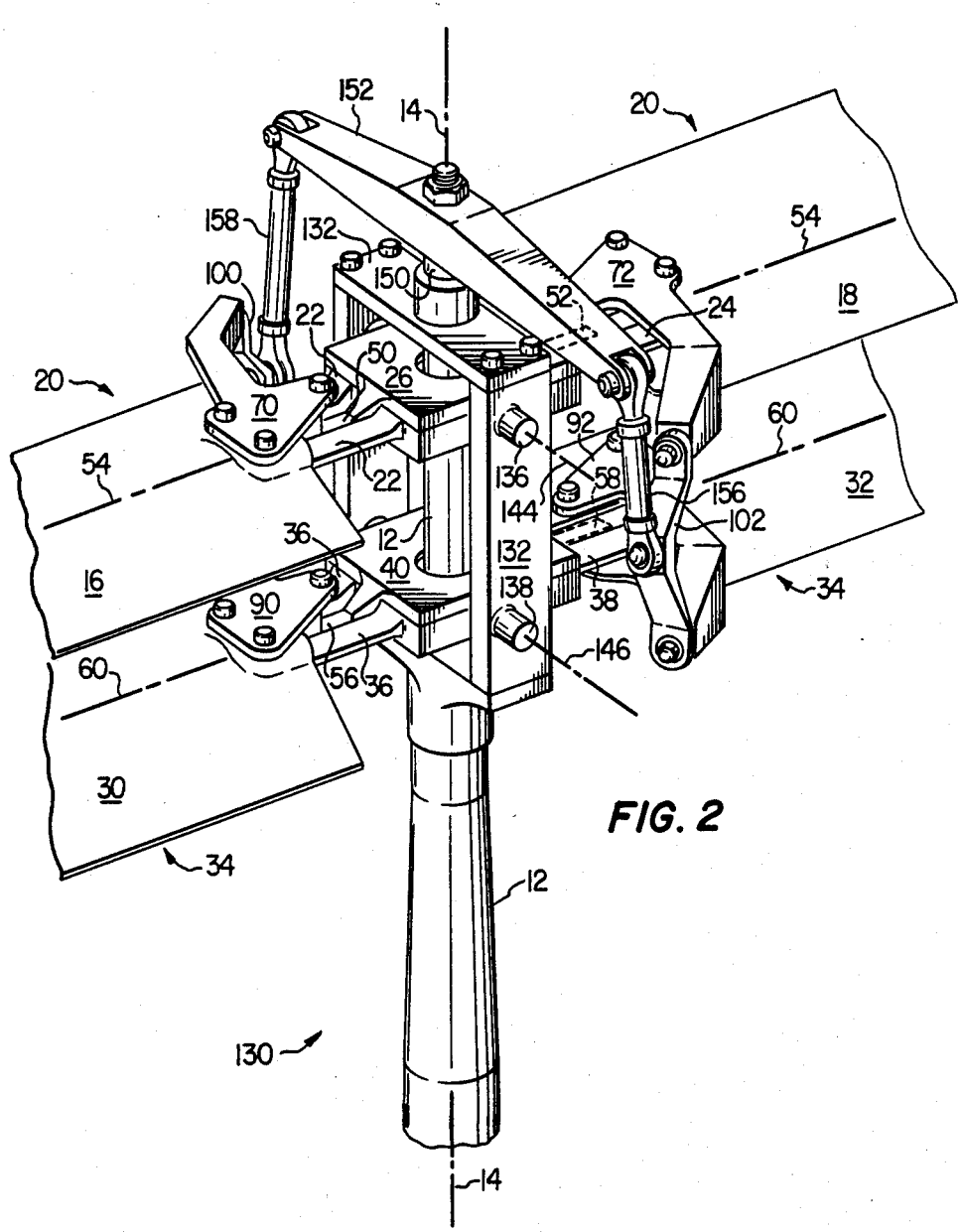
FIG. 2 is a perspective view of a second embodiment of the present helicopter tail rotor.

Referring now to FIG. 2, wherein like reference numerals for like and corresponding components previously identified are used, a second embodiment of the present invention is illustrated and includes a tail rotor, generally identified by the numeral 130. Tail rotor 130 operates in a manner similar to tail rotor 10; however, whereas tail rotor 10 has a common flapping bearing about trunnion 46, tail rotor 130 has two flapping bearings, one for rotor blade pair 20 and one for rotor blade pair 34. Hub clamp 26 and hub clamp 40 are separately mounted for rotation in a frame 132 using trunnions 136 and 138 about flapping axes 144 and 146, respectively. Blade pitch is constrained to occur about pitch change axes 54 and 60 about pitch change spindles 50, 52, 56 and 58 as described with respect to tail rotor 10 (FIG. 1).

Pitch change is imparted to rotor blade pair 20 and rotor blade pair 34 through a control system operated through drive mast 12. Drive mast 12 includes a sliding tube 150 having its lowermost end connected to pitch-control clevis 112 which is interconnected to idler lever 114 whose input is controlled by input control lever 116 (FIG. 1). The upper end of sliding tube 150 is interconnected to a cross bar 152. Cross bar 152 is pivotally connected to pitch links 156 and 158 which in turn are pivotally connected to pitch horn connector links 100 and 102. Sliding tube 150 functions in a manner similar to swashplate 110 (FIG. 1) in order to control pitch change about pitch change axes 54 and 60 of rotor blade pair 20 and rotor blade pair 34, respectively.

While rotor blade pair 20 and rotor blade pair 34 have been described as having a one piece hub/flexure/spar structure extending to the tips of the respective blades, tail rotor 10 and tail rotor 130 may also include four separate blades, such as an articulated rotor.

It therefore can be seen that the present invention provides for a tail rotor having the desirable features of a conventional four-bladed tail rotor including good aspect ratio, decreased rotational speed, decreased tip noise and smaller radius with the desirable aspects of a two-bladed teetering tail rotor having a simple flapping bearing arrangement and a lightweight hub. The present invention comprises two rotor blade pairs having their pitch-change axes stacked vertically about a drive mast for a tail rotor and includes a common or separate flapping bearings for each rotor blade pair.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A helicopter tail rotor comprising:
    a drive mast having an axis of rotation;
    a first blade pair mounted for rotation about said drive mast axis of rotation, said first blade pair having a pitch change axis perpendicularly disposed to said drive mast axis of rotation; and
    a second blade pair mounted for rotation about said drive mast axis of rotation and being spaced apart from and parallel disposed to said first blade pair, said second blade pair having a pitch change axis parallel to said pitch change axis of said first blade pair and being rotatable in the same direction as said first blade pair about said drive mast.

2. The helicopter tail rotor of claim 1 and further including:
    means interconnecting said first and said second blade pairs for controlling blade pitch-change about said blade pitch-change axis of said first and said second blade pairs.

3. The helicopter tail rotor of claim 1 wherein said drive mast further includes:
    means for supporting said first and said second blade pairs to allow said blade pairs to flap about an axis perpendicular to said axis of rotation.

4. The helicopter tail rotor of claim 3 wherein said support means includes means for supporting both said first and said second blade pairs for flapping motion about a common flapping axis.

5. The helicopter tail rotor of claim 3 wherein said support means includes means for supporting said first blade pair for flapping motion about a first flapping axis and means for supporting said second blade pair for flapping motion about a second flapping axis disposed parallel to and spaced apart from said first flapping axis.

6. A helicopter tail rotor comprising:
    a drive mast having an axis of rotation;
    a first blade pair for rotation about said drive mast axis of rotation, said first blade pair having a pitch change axis perpendicularly disposed to said drive mast axis of rotation;
    flexure portions connecting each blade of said first blade pair to said drive mast;
    a second blade pair for rotation about said drive mast axis of rotation and being spaced apart from and parallel disposed to said first blade pair, said second blade pair having a pitch change axis parallel to said pitch change axis of said first blade pair and being rotatable in the same direction as said first pair about the said drive mast;
    second flexure portions connecting each blade of said second blade pair to said drive mast; and
    a pitch link connector connecting said first and second blade pair such that pitch change of the said first and second blade pairs occurs simultaneously and at about the same angle.

7. A tail rotor comprising:
    a drive mast having an axis of rotation;
    a hub link pivotally mounted on said drive shaft such that the axis of pivot of said link is perpendicular to the axis of rotation of said drive mast;
    a first blade pair for rotation about said drive mast axis of rotation, said first blade pair having a pitch change axis perpendicularly disposed to said drive mast axis of rotation;

flexure portions connecting each blade of said first blade pair to said hub link;

a second blade pair for rotation about said drive mast axis of rotation and being spaced apart from and parallel disposed to first said blade pair, said second blade pair having a pitch change axis parallel to said pitch change axis of said first blade pair and being rotatable in the same direction as said first pair of about said drive axis of rotation;

second flexure portions connecting each blade of said second blade pair to said hub link; and a pitch link connector connecting said first and second blade pair such that pitch change of said first and second blade pairs occur simultaneously and at about the same angle.

* * * * *